United States Patent [19]

Engstrom et al.

[11] Patent Number: 5,818,626
[45] Date of Patent: Oct. 6, 1998

[54] METHOD AND APPARATUS FOR OPTICAL ISOLATION

[75] Inventors: Brian L. Engstrom, Hopkinton; Siu-Yan B. Ng, Cambridge, both of Mass.

[73] Assignee: Agfa Division, Bayer Corp., Wilmington, Mass.

[21] Appl. No.: 298,447

[22] Filed: Aug. 29, 1994

[51] Int. Cl.[6] .............................. G02B 5/30; G02B 28/06; G02B 27/28; G02F 1/09
[52] U.S. Cl. ........................ 359/281; 359/282; 359/298; 359/484; 359/487; 359/494; 359/495; 359/497; 372/703
[58] Field of Search .................... 359/281, 282, 359/298, 484, 487, 490, 494, 495, 497, 501, 900; 372/703; 369/110

[56] References Cited

U.S. PATENT DOCUMENTS

| 3,675,125 | 7/1972 | Jaecklin. | |
|---|---|---|---|
| 4,963,003 | 10/1990 | Hiiro | 359/495 |
| 5,048,030 | 9/1991 | Hiiro | 359/495 |
| 5,052,786 | 10/1991 | Schulz | 359/484 |
| 5,089,786 | 2/1992 | Tamura | 359/484 |
| 5,504,619 | 4/1996 | Okazaki | 359/495 |
| 5,574,595 | 11/1996 | Kurata et al. | 359/484 |

FOREIGN PATENT DOCUMENTS

| 0132214 | 8/1983 | Japan | 359/487 |
|---|---|---|---|
| 0218623 | 11/1985 | Japan | 359/484 |
| 0223824 | 10/1986 | Japan | 359/484 |
| 0169423 | 7/1989 | Japan | 359/484 |

*Primary Examiner*—Ricky D. Shafer
*Attorney, Agent, or Firm*—Julie A. Krolikowski; John A. Merecki

[57] ABSTRACT

An optical isolator and circular polarizer are used in combination to optically isolate specular and diffuse reflections which result when a forward traveling radiation beam encounters an optical or non-optical boundary surface. The forward traveling radiation beam is linearly polarized with a linear polarizer such that its plane of linear polarization is aligned with a first polarization axis, then the axis of linear polarization is rotated to a second polarization axis with a polarization rotator and finally the linearly polarized forward traveling beam is circularly polarized with a quarter wave retarder.

25 Claims, 4 Drawing Sheets

METHOD AND APPARATUS FOR OPTICAL ISOLATION

BACKGROUND OF THE INVENTION

1. Field of the Invention

The present invention is directed generally to a method and apparatus for optical isolation and more specifically to preventing optical feedback in laser optical systems.

2. Description of the Prior Art

Optical systems often experience performance degradation due to stray radiation in the form of specular and diffuse reflections from various optical and non-optical boundary surfaces encountered by a forward traveling radiation beam. It is a particular problem in laser optical systems and especially in solid state laser optical systems that specular and diffuse reflections from boundary surfaces re-enter the laser cavity and disturb the steady state laser action. The reflected energy in laser optical systems is known as "optical feedback" and can cause power amplitude fluctuations, frequency shifts and noise in the laser output beam.

In laser applications which require strict control of laser beam parameters at a laser work surface, optical feedback presents a serious limit to maintaining the uniformity. The problem is especially difficult in laser optical systems having an output beam power above about 1 watt since high energy densities occur at each boundary surfaces and even the boundary surfaces of transmissive optical elements, which typically have reflectivities between about 0.5 and 4.0% per surface, produce specular and diffuse reflections which result in optical feedback.

It is generally known in laser optical systems to tilt optics and laser work surfaces so that specular reflections from these boundary surfaces are directed away from the laser cavity. In many cases however, reflected beams are rapidly diverging such that even when the optical elements are tilted, at least a portion of the specularly reflected energy can re-enter the laser cavity. To eliminate virtually all optical feedback, large tilt angles would be required. However, the large tilt angles are impractical since the optical performance of the tilted element would be degraded.

Subsequently it became known to incorporate an optical isolator in the path of the laser output beam, near the laser cavity exit aperture, to isolate reflected energy and reduce optical feedback. An optical isolator the forward transmission of a radiation beam, in this case the laser output beam, while simultaneously preventing the reverse transmission of a radiation beam, with a high degree of extinction. Here the laser energy reflected from various optical and non-optical boundary surfaces is trapped and extinguished by the optical isolator.

Optical isolators using permanent magnets are available for use in laser systems, e.g. from the US manufacturer OPTICS FOR RESEARCH. These optical isolators generally comprise a first linear polarizer for aligning the plane of linear polarization of a laser output beam parallel with the first linear polarizer transmission axis, a magneto-optical material and permanent magnet, e.g., a Faraday rotator for rotating the plane of linear polarization of the laser output beam to align with a second polarization axis, e.g. rotated 45° clockwise from the transmission axis of the first linear polarizer, and a second linear polarizer having a transmission axis aligned with the second polarization axis. The laser output beam therefore enters the optical isolator having an arbitrary state of polarization and exits the optical isolator, linearly polarized with its plane of linear polarization aligned with the second polarization axis.

A reflected beam returning from a boundary surface of the laser optical system to the optical isolator, regardless of its state of polarization, is linearly polarized by the second linear polarizer such that its plane of linear polarization is parallel with the second polarization axis. The magneto-optical material now rotates the plane of polarization of the reflected beam by 45° in the same rotation direction, i.e. clockwise, thereby aligning the plane of linear polarization of the reflected beam along an axis which is perpendicular to the transmission axis of the first linear polarizer. The reflected beam is therefore extinguished by the first linear polarizer. Extinction ratio's of 100,000 to 1 are achievable in this manner and Faraday rotators offer low losses to the forward traveling beam, with an insertion loss of less than 5% possible.

Generally a steady state background level of optical feedback exists in all laser optical systems. Even with an optical isolator near the laser exit aperture, reflections from the optical surfaces of the optical isolator itself re-enter the laser cavity as optical feedback. However, non-time-varying optical feedback tends not to affect the laser output beam. Instead, laser output beam parameter fluctuations begin to occur when the amplitude of optical feedback power changes abruptly. Such abrupt variations in optical feedback can lead to laser spiking, i.e. a series of disruptive amplitude spikes in the laser output power. Laser spiking degrades the laser optical system performance and can cause physical damage to optics. The frequency at which optical feedback amplitude variations occur is also a factor in the onset of laser spiking and other output beam parameters since the dynamics which cause laser spiking, laser radiation frequency shifts and noise are dependent on the particular laser cavity and vary according to the cavity length, its design and the lasing material being utilized. It is for this reason that a general solution to optical feedback in laser optical systems has been elusive. (See LASERS, by Siegman, University Science Books, Mill Valley Calif., 1986 page 955.)

One cause of abrupt changes in the power amplitude of optical feedback is due to changes in the reflectivity at the laser work surface, e.g. when the temperature or phase of the work surface changes abruptly as in thermal laser applications such as welding or surgery. Another example of abrupt changes in optical feedback power amplitude due to changes in the reflectivity of the laser work surface is in scanning systems wherein a surface being scanned by the laser output beam has spatially varying reflectivity over its area. As the work surface is scanned its reflectivity variations cause the power amplitude of specular and diffuse reflections returning to the laser cavity to vary widely. While the use of an optical isolator offers a high extinction ratio for both specular and diffuse reflections, in certain applications especially for specular reflections in laser systems, a very high specular extinction ratio is required which is not provided by the optical isolator alone.

It is known in interferometer systems to use a linear polarizer and quarter wave retarder in series to extinguish a specular reflection from a mirror or beam splitter boundary surface oriented at normal incidence with respect to a forward traveling laser beam. Such a combination of elements when placed at normal incidence in the path of the beam between the laser and a mirror or beam splitter boundary surface first linearly polarizes the forward traveling beam at the linear polarizer and then circularly polarizes it before it encounters the mirror or beam splitter boundary surface. Upon encountering the mirror or beam splitter boundary surface, the circularly polarized forward traveling laser beam is reflected with it's sense of circular polarization reversed, i.e. left handed circular polarization becomes right handed circular polarization. The reflected circularly polarized beam then re-passes through the quarter wave retarder and is again linearly polarized however, it's plane of linear polarization is now perpendicular to the plane of linear polarization of the forward traveling beam. The reflected beam is therefore extinguished by the linear polarizer.

A linear polarizer in combination with a quarter wave retarder is a known isolator which extinguishes reflected energy which is circularly polarized and attenuates reflected energy which is non-circularly polarized. Such an isolator offers maximum isolation for specular reflections from a boundary surface having normal incidence with respect to a forward traveling beam which encounters it.

Given the limitations of the prior art described above it is, accordingly, a general object of the present invention to provide an improved method and apparatus for optical isolation.

It is a specific object of the present invention to provide an improved method and apparatus for isolating optical feedback in a laser optical system.

It is another object of the present invention to provide an improved method and apparatus for isolating optical feedback in a laser optical system while providing a low power amplitude insertion loss to a forward traveling laser beam.

SUMMARY OF THE INVENTION

The invention is a method and apparatus for isolating reflections from at least one boundary surface encountered by a forward traveling radiation beam. Reflections from each boundary surface result in a specularly reflected radiation beam and a diffusely reflected radiation beam each of which has a portion which propagates in a direction which is substantially opposite to the propagation direction of the forward traveling radiation beam. The method for isolating the specularly and diffusely reflected radiation beams comprises the steps of:

(a) linearly polarizing the forward traveling radiation beam parallel with the plane of linear polarization substantially parallel with a first polarization axis;

(b) rotating the plane of linear polarization of the linearly polarized forward traveling radiation beam to a second polarization axis;

(c) circularly polarizing the linearly polarized forward traveling radiation beam with a first rotation sense, before the forward traveling radiation beam encounters the boundary surface, and linearly polarizing the specularly reflected radiation beam when the specularly reflected radiation beam is circularly polarized with a rotation sense which is opposite to the first rotation sense;

(d) linearly polarizing the specularly reflected radiation beam and the diffusely reflected radiation beam with the plane of linear polarization substantially parallel with the second polarization axis;

(e) rotating the plane of linear polarization of the specularly reflected radiation beam and the diffusely reflected radiation beam to a polarization axis which is substantially perpendicular to the first polarization axis; and, (g) passing the specularly reflected radiation beam and the diffusely reflected radiation beam through a linear polarizer having a transmission axis which is substantially parallel with the first polarization axis.

BRIEF DESCRIPTION OF THE DRAWINGS

The objects and features set forth above and other objects and features of the invention will best be understood from a detailed description of a preferred embodiment thereof, selected for the purposes of illustration and shown in the accompanying drawings in which.

DESCRIPTION OF THE PREFERRED EMBODIMENTS

Figure 1:
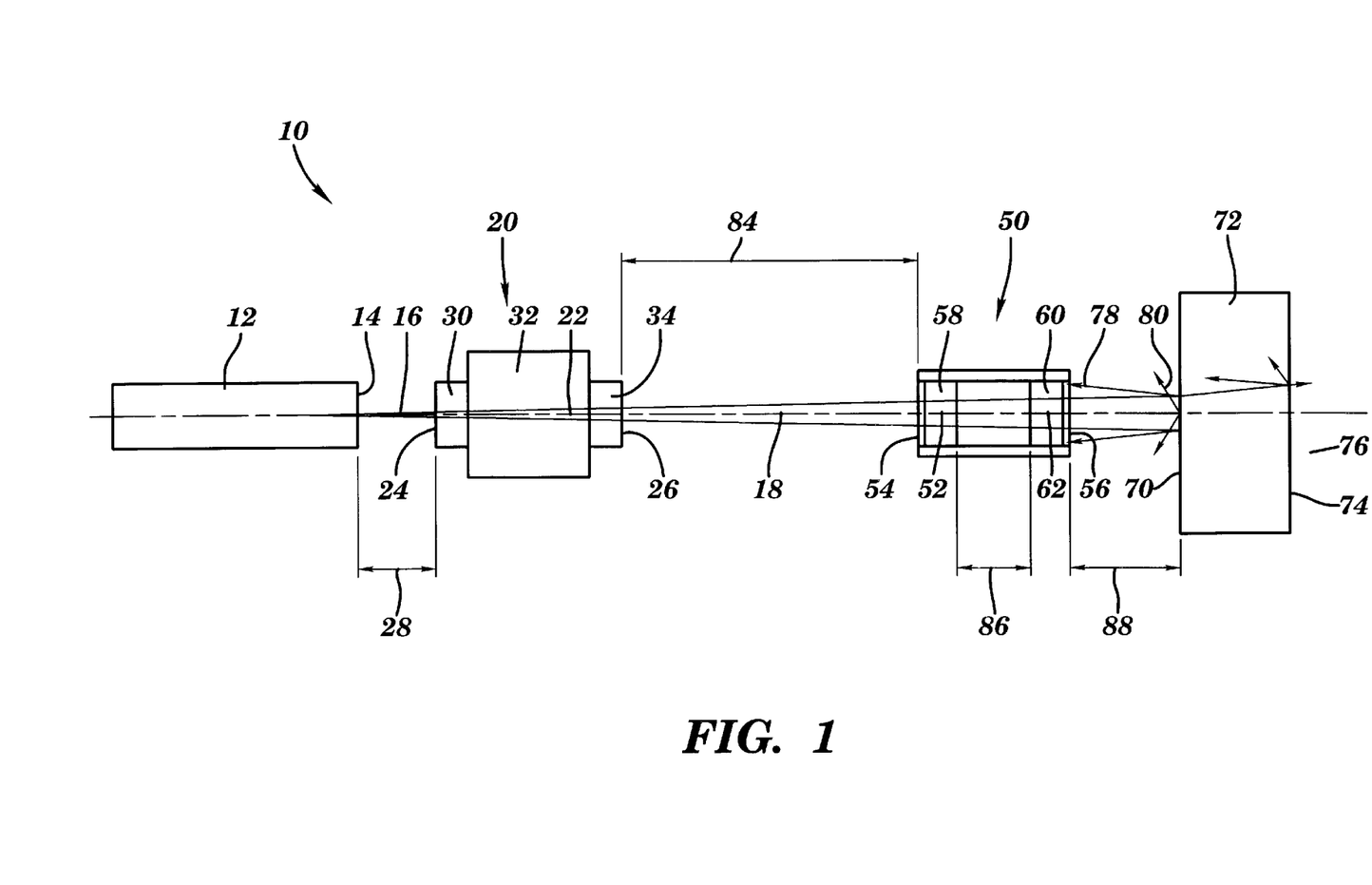
FIG. 1 details a portion of a laser optical system which includes a laser, a forward traveling laser beam, specular and diffuse reflection isolating components and a boundary surface from which specular and diffuse reflections are to be isolated.

Turning now to the drawings, the preferred embodiment of the present invention is shown in FIG. 1 wherein a portion of a laser optical system specifically detailing optical isolating components for isolating laser feedback is indicated generally by reference numeral 10. The partial laser optical system 10 comprises a laser 12 having an exit aperture 14 and a forward traveling laser beam 16, exiting from the laser aperture 14, and propagating from left to right along a propagation axis 18.

The forward traveling laser beam 16 first enters an optical isolator indicated generally by reference numeral 20. The optical isolator 20 has an optical axis 22, an entrance aperture 24 and an exit aperture 26. The optical isolator 20 is positioned with its optical axis 22 substantially coincident with the laser beam propagation axis 18 such that the forward traveling laser beam 16 enters the optical isolator entrance aperture 24, passes substantially along the optical isolator optical axis 22 and exits from the optical isolator exit aperture 26. The optical isolator 20 is positioned at a distance 28 from the laser exit aperture 14 but the distance 28 is not critical and need only be sufficiently small that the forward traveling laser beam 18 is not excessively clipped by the isolator entrance aperture 24.

The optical isolator 20 comprises the following elements, each having an optical axis coincident with the optical isolator optical axis 22 and positioned in series with respect to the entrance aperture 24. A first linear polarizer 30, for linearly polarizing the forward traveling laser beam 16 and for attenuating a reflected beam. A magneto-optical polarization rotator 32 for rotating the plane of polarization of the linearly polarized forward traveling laser beam 16, and; a second linear polarizer 34 for linearly polarizing a reflected beam which enters the optical isolator 20 through it's exit aperture 26.

Figure 2:
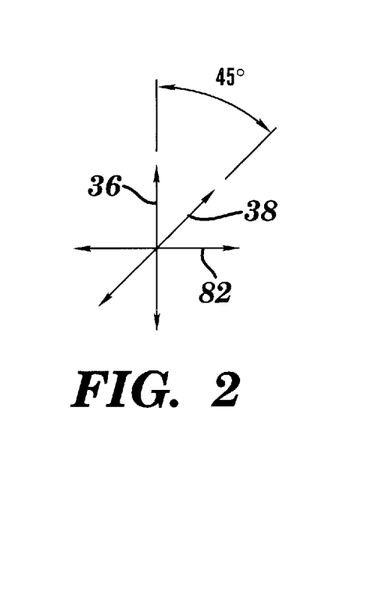
FIG. 2 is a vector diagram, included for illustrative purposes, for detailing the orientation of various linear polarization axes with respect to the vertical axis.

Referring now to FIGS. 1 and 2, the forward traveling laser beam 16 passes from the laser exit aperture 14 to the optical isolator entrance aperture 24 and through the first linear polarizer 30 where it is linearly polarized with its plane of linear polarization aligned parallel with the first polarization axis 36. It then passes through the magneto-optical polarization rotator 32 which rotates the plane of linear polarization clockwise through an angle of substantially 45° thereby aligning the plane of linear polarization of the laser beam 16 with a second polarization axis 38. The beam 16 now passes through the second linear polarizer 34 which has its transmission axis aligned parallel with the second polarization axis 38 such that the forward traveling laser beam 16 is substantially unattenuated by the second linear polarizer 38. The laser beam 16 then exits the optical isolator 20 through it's exit aperture 26 with a polarization state which is linearly polarized having it's plane of linear polarization parallel with the second polarization axis 38. This axis may also be referred to as the transmission axis of the optical isolator 20. Note that regardless of the polarization state of the beam 16 as it entered the optical isolator 20, the state of polarization as it exits is the same as that described above. However, when the forward traveling laser beam 16 is initially linearly polarized, its plane of linear polarization should be aligned parallel with the transmission axis of the first linear polarizer 30, i.e. parallel with the first polarization axis 36, to minimize the insertion loss of the optical isolator 20.

First and second linear polarizers 30 and 34 detailed above and the linear polarizer 58 detailed below each linearly polarize a radiation beam which passes through it. The polarizers 30, 34 and 58 each have an optical axis, (not shown), which is aligned substantially parallel with the beam propagation axis 18, and a transmission axis, (not shown), which is perpendicular to the optical axis. The transmission axis of each linear polarizer represents the axis of maximum power amplitude transmission for a beam passing through it. That is, when the forward traveling laser beam 16 has its plane of linear polarization aligned parallel with the transmission axis of the linear polarizer 30, 34 or 58, through which it is passing, the beam 16 is substantially unattenuated by the linear polarizer. When the laser beam 16 is not linearly polarized, e.g. randomly, circularly or elliptically polarized, or when the laser beam 16 is linearly polarized but the plane of linear polarization is not aligned parallel with the transmission axis of the linear polarizer 30, 34 or 58, then the laser beam 16 is attenuated by the linear polarizer according to Malus's Law, (listed below), with the maximum attenuation or extinction occurring when the beam 16 is linearly polarized with its plane of linear polarization perpendicular to the transmission axis of the linear polarizer 30, 34 or 58.

Regardless of the state of polarization of the beam 16 as it enters any of the linear polarizer 30, 34 or 58, the state of polarization of the laser beam 16 after it passes through the polarizer is linearly polarized with its plane of linear polarization parallel with the transmission axis of the polarizer. Furthermore, the properties of each linear polarizers 30, 34 and 58 are independent of the direction of propagation of the laser beam 16 and are optimized when the beam 16 propagates along an axis which is nearly parallel with the optical axis of the polarizer.

The polarizers 30, 34 or 58 can be dichroic, i.e. polarizing by selective absorption, reflective, i.e. polarizing by selective reflection, scattering, i.e. polarizing by selective scattering, or birefringent, i.e. polarizing by selective transmission or they may have other configurations e.g. electro-optical. In the preferred embodiment a reflective polarizer proved to be the optimal selection since it offered a low insertion loss to the laser beam 16 while not being damaged by the laser beam 16 which can exceed 5 watts. It will be appreciated however that any linear polarizer can be used without varying from the scope of the present invention and that the selection of a polarizer for use in the present invention depends on the power amplitude, wavelength, frequency and modulation rate of the particular laser beam 16 used in the laser optical system to be optically isolated.

The magneto-optical rotator 32 is a well know apparatus for rotating the plane of polarization of a transmitted beam and relies upon the application of an magnetic field to a normally optically inactive crystal material to provide polarization rotation. Faraday rotation however is only a subset of optical activity, a phenomenon of solid state optics wherein the plane of polarization of a linearly polarized radiation beam is rotated as it passes through an optically active crystal. A number of crystals are known to be optically active including quartz, sodium chlorate and cinnabar, (See INTRODUCTION TO MODERN OPTICS, by G. R. Fowles, Copyright 1975 by Holt, Rinehart and Winston, Page 169). Optically active materials rotate the plane of polarization of a transmitted radiation beam without any electric or magnetic field being applied. Another type of polarization rotator, the Kerr cell, rotates the plane of polarization of a transmitted beam when an electric field is applied to an optically inactive crystal. It will be appreciated that another polarization rotator configuration can be used in place of the magneto-optical rotator 32 without varying from the scope of the present invention.

A specular reflection isolator, referred to generally by reference numeral 50, having an optical axis 52, an entrance aperture 54 and an exit aperture 56 is located between the optical isolator 20 and a boundary surface 70, from which a reflection is to be isolated. The specular isolator 50 is positioned with it's optical axis 52 substantially coincident with the laser beam propagation axis 18 such that the forward traveling laser beam 16 enters through its entrance aperture 54 and exits through its exit aperture 56. The boundary surface 70 is any transition surface across which a change in index of refraction occurs and from which a reflection is to be isolated.

The specular reflection isolator 50 comprises in series, following the entrance aperture 54, a third linear polarizer 58 and a quarter wave retarder 60. The quarter wave retarder 60 has an optical axis 62 which is oriented substantially coincident with the beam propagation axis 18. Third linear polarizer 58 has its transmission axis aligned substantially parallel to the plane of polarization of the forward traveling laser beam 16 as it exits the optical isolator 20, i.e. parallel with the second polarization axis 38, such that as the beam 16 passes through the third linear polarizer 58, it is substantially unattenuated and remains linearly polarized with its linear polarization axis parallel with the second polarization axis 38.

Quarter wave retarder 60 is a birefringent element having a "fast transmission axis", and the "slow transmission axis", (not shown). The fast and slow transmission axes are perpendicular to each other and to the quarter wave retarder optical axis 62. A linearly polarized beam which passes through the quarter wave retarder 60 will be circularly polarized when it's plane of linear polarization makes a 45° angle with respect to the fast transmission axis of the retarder 60.

In the present invention, the laser beam 16, exits the third linear polarizer 58 with its plane of linear polarization aligned with the second polarization axis 38 and the quarter wave retarder 60 is oriented with its fast transmission axis aligned parallel with the first polarization axis 36. The laser beam 16 is therefore circularly polarized as it passes through the quarter wave retarder 60. The sense of circular polarization, i.e. right handed or left handed is arbitrary for the present invention but can be reversed by rotating the quarter wave retarder 60 by 90° such that its slow transmission axis is aligned with the second polarization axis 38.

The purpose of the quarter wave retarder 60 is to provide a circularly polarized beam at the boundary surface 70. The performance of the quarter wave retarder 60 is wavelength dependent and as such, circular polarization is only achieved when it's material properties and thickness are matched to the particular wavelength of the laser beam 16. The sense of polarization rotation produced by the retarder 60 can also be material dependent.

Although single element quarter wave retarders are commercially available, e.g. from the US manufacturer MELLES GRIOT, a quarter wave retarder can be more generally defined. Such an apparatus produces a quarter wave phase differential between two linearly polarized radiation beams, having the same optical frequency but orthogonal planes of linear polarization, when the beams pass through it simultaneously. It will be appreciated that any device for converting a forward traveling linearly polarized radiation beam into a forward traveling circularly polarized beam with a first sense of polarization rotation does not vary from the scope of the present invention provided that a circularly polarized radiation beam having an opposite sense of rotation and passing through the device in the opposite direction is converted to a linearly polarized radiation beam having a plane of linear polarization which is orthogonal that of the forward traveling linearly polarized radiation beam.

After exiting the specular reflection isolator 50, the circularly polarized forward traveling laser beam 16 continues to propagate along the axis 18 until it encounters the boundary surface 70. Boundary surface 70 is located at a distance 88 from the specular reflection isolator exit aperture 56 and can have an incident angle with respect to the beam propagation axis 18 which varies from normal incidence, (i.e. perpendicular to the laser beam propagation axis 18), to grazing incidence, (i.e. parallel with the laser beam propagation axis 18). The distance 88 is not critical but smaller distances 88 tend to increase the amount of reflected energy which can return to the laser optical system 10.

In the preferred embodiment, the laser beam 16 propagates through air having an index of refraction of near unity until it encounters the boundary surface 70 bounding a volume 72 having a refractive index different than that of air. The interaction of the laser beam 16 with the boundary surface 70 results in a specular reflection, a diffuse reflection and a transmission of a portion of the laser beam 16, across the boundary surface 70, into the volume 74. The transmitted portion of the laser beam 16 continues to propagate within the volume 72 where the beam 16 is at least partially absorbed and may continue to propagate until it encounters another boundary surface 74 where the beam 16 is again specularly and diffusely reflected and where a portion of the beam 16 may be transmitted into the next volume 76.

The boundary surfaces 70 and 74 can be optical surfaces, e.g. a mirror, lens, polarization element or laser work surface, a or non-optical surface, e.g. a cover, safety shield or mechanical structure. Furthermore, a plurality of boundary surfaces like the surfaces 70 and 72 will be present in a typical laser optical system and the incident angle that the laser beam 16 makes with each of the plurality of boundary surfaces 70 and 74 can vary from normal to grazing incidence.

In the following detailed description of how the present invention optically isolates reflected energy from a plurality of boundary surfaces such as 70 and 74, it will be appreciated that each of the plurality of boundary surfaces 70 and 74 produces a specular reflection and that a net specularly reflected beam 78, comprising a portion of the specularly reflected energy from each of the surfaces 70 and 74, propagates substantially along the axis 16 in a propagation direction substantially opposite to the propagation direction of the forward traveling laser beam 16. The net specularly reflected beam 78 propagates toward the laser exit aperture 14 and therefore represents a potential source of laser feedback to be isolated. Furthermore, it will be appreciated that the net specularly reflected beam 78 can result from reflections which occur at a plurality of incident angles such that the net specularly reflected beam 78 comprises a plurality of specularly reflected beams each having a polarization state which is dependent upon the incident angle that the forward traveling laser beam 16 made with the particular reflecting boundary surface 70 or 74 from which it was reflected.

Furthermore, a net diffusely reflected beam 80 also propagates substantially along the axis 18 in a propagation direction substantially opposite to the propagation direction of the forward traveling laser beam 16 toward the laser exit aperture 14 and that the net diffusely reflected beam 80 comprises at least a portion of the diffusely reflected energy reflected from each of the plurality boundary surfaces 70 and 74. The net diffusely reflected beam 80 also represents a potential source of laser feedback to be isolated. It will be appreciated that the net diffusely reflected beam 80 also results from reflections which occur at a plurality of incident angles such that the net diffusely reflected beam 80 comprises a plurality of diffusely reflected beams each having a polarization state which is dependent upon the incident angle that the forward traveling laser beam 16 made with the particular reflecting boundary surface 70 or 74 from which it was reflected.

Taking a single boundary surface 70 and a single specularly reflected beam 78 by way of example, the circularly polarized forward traveling laser beam 16 specularly reflects from the surface 70 forming a specularly reflected beam 78. For the particular condition of normal incidence between the forward traveling laser beam 16 and the surface 70, the specularly reflected beam 78 is circularly polarized and the sense of circular polarization rotation is reversed by the reflection, i.e. a right-hand circularly polarized beam becomes a left-hand circularly polarized beam after reflection.

Upon returning through the quarter wave retarder 60, the circularly polarized specularly reflected beam 78 is linearly polarized by the retarder 60 and it's plane of linear polarization is aligned parallel with a polarization axis 82. The specularly reflected beam 78 which resulted from a normal incidence reflection from the boundary surface 70 is therefore completely extinguished by the third linear polarizer 58 since the polarization axis 82 is perpendicular to its transmission axis.

When the condition where the incidence angle between the forward traveling laser beam 16 and the boundary surface 70 is between nearly normal incidence and nearly grazing incidence, the spectrally reflected beam 78 which results from reflection of the circularly polarized laser beam 16 is elliptically polarized and the sense of polarization rotation is also reversed by the reflection, i.e. a right-hand circularly polarized laser beam 16 becomes a left-hand elliptically polarized specularly reflected laser beam 78, after reflection. When the incident angle between the forward traveling laser beam 16 and the boundary surface 70 is at grazing incidence, the specularly reflected beam 78 is linearly polarized along an axis which is parallel with the boundary surface 70. Although such a beam would not return directly to the partial laser optical system 10, it will be appreciated that a grazing incidence specularly reflected beam can return to the partial laser optical system 10 after subsequent reflections from other boundary surfaces e.g. 74.

Upon returning through the quarter wave retarder 60, an elliptically polarized specularly reflected beam 78 remains elliptically polarized but the alignment of the long axis of the ellipse varies from nearly parallel with the polarization axis 82, for reflections which resulted from nearly normal incident angles, to nearly parallel with the second polarization axis 38, for reflections which resulted from nearly grazing incidence angles.

Upon passing through the third linear polarizer 58, the specularly reflected beam 78 is attenuated according to Malus's Law such that its power amplitude after exiting the third linear polarizer 58 is at a minimum when the plane of linear polarization is nearly parallel with the polarization axis 82, at a maximum when the beam's plane of linear polarization is nearly parallel the second polarization axis 38, i.e. the transmission axis of the third linear polarizer 58, and varies according to the relationship $I(\emptyset)=I(O)*COS^2(\emptyset)$ for angles in between, where $\emptyset$ is the angle between the plane of linear polarization of the beam 78 and the transmission axis of the second linear polarizer 58, $I(0)$ is the intensity of the beam 78 before passing through the second linear polarizer 58 and $I(\emptyset)$ is the intensity of the beam 78 after it passes through the second linear polarizer 58 as a function of the angle $\emptyset$. In this case, $\emptyset$ is equal to zero for reflections which result from grazing incidence and $\emptyset$ is equal to 90° for reflections which result from reflections at normal incidence.

For specular reflections which resulted from the forward traveling laser beam 16 having grazing incidence with the boundary surface 70, the specularly reflected beam 78 is linearly polarized and upon returning through the quarter wave retarder 60, the linear polarization specularly reflected beam 78 will be either unchanged or rendered elliptically polarized depending on the angle between its plane of linear polarization and the fast transmission axis of the quarter wave retarder 60. Upon returning through the third linear polarizer 58, a linearly or elliptically polarized beam is attenuated according to Malus's Law.

Considering now the case of a single boundary surface 70 having a single diffusely reflected beam 80, the circularly polarized forward traveling laser beam 16 diffusely reflects from the surface 70 forming a diffusely reflected beam 80. The diffusely reflected beam 80 radiates substantially uniformly in a hemisphere about the intersection of the propagation axis 18 and the boundary surface 70 such that at least a portion of the rays are directed toward the specular reflection isolator 50. The polarization of the diffusely reflected beam 80 varies according to its propagation direction after reflection such that diffusely reflected rays reflected substantially along the propagation axis 18 are substantially randomly polarized while diffusely reflected rays reflected substantially parallel with the boundary surface 70 are substantially linearly polarized and diffusely reflected rays reflected at reflection angles in between comprise randomly and linearly polarized portions.

Upon returning through the quarter wave retarder 60, the diffusely reflected beam 80, which can be partially randomly polarized and partially linearly polarized, has its state of polarization modified by the retarder 60. Upon returning through the third linear polarizer 58, the diffusely reflected beam 80 is attenuated according to Malus's Law, which for a substantially randomly polarized beam results in approximately 50% attenuation.

The features of the specular reflection isolator 50 stated above are that it extinguishes specularly reflected beams which result from reflections from boundary surfaces oriented at normal incidence, it attenuates specularly reflected beams which resulted from reflections from boundary surfaces oriented at incident angles between normal and grazing incidence and it offers an average of 50% attenuation for diffusely reflected beams. In all cases, any portion of the specularly reflected beam 78 or the diffusely reflected beam 80 which exit the specular reflection isolator 50 has a state of polarization which is linear with its plane of linear polarization and is aligned parallel with the second polarization axis 38.

Having passed through the specular reflection isolator 50, the specularly reflected beam 78, and the diffusely reflected beam 80, each attenuated, continue to propagate substantially along the axis 18 and enter the exit aperture 26 of optical isolator 20. Since each beam is linearly polarized along the second polarization axis 38, they pass through the second linear polarizer 34 unattenuated.

The reflected beams 78 and 80 then pass through the magneto-optical rotator 32 which rotates the plane of polarization of each beam through a clockwise angle of 45°, aligning them parallel with a polarization axis 82. Note that the magneto-optic rotator 32 has the particular property that it rotates the plane of polarization of a forward traveling beam and an oppositely traveling radiation beam through the same rotation angle and in the same direction. Since the polarization axis 82 is perpendicular with the transmission axis of the first linear polarizer 30, the remaining portion of the specularly reflected beam 78 and the diffusely reflected beam 80 are extinguished by the first linear polarizer 30 such that no reflected energy reaches the laser exit aperture 14.

The features of the combination of an optical isolator 20 and a specular reflection isolator 50 are that they completely extinguish both the specularly reflected beam 78 and the diffusely reflected beam 80 regardless of the incident angle of the forward traveling laser beam 16 with the boundary surface 70. In the general case where the forward traveling beam 16 reflects from a plurality of boundary surfaces 70 and 74 having passed through a plurality of bounded regions 72, the net specularly and diffusely reflected beams 78 and 80 are extinguished in the same way as is described above for the particular case of a single boundary surface 70.

From the preceding discussion detailing a method and apparatus for improved optical feedback isolation in laser systems, it will be appreciated that the optical isolator 20 and the specular reflection isolator 50 used in combination offer improved optical isolation over the use of either element alone. It will be further appreciated that the separation distances 28, 84, 86 and 88, shown in FIG. 1, are not critical to the performance of the present invention but need only be sufficiently small so as to sufficiently capture the specularly and diffusely reflected beams 78 and 80 to be isolated. Furthermore it will be appreciated that the third linear polarizer 58 can be eliminated from the preferred embodiment without changing the operating mode of the invention. In a more general embodiment, shown in FIG. 3, the optical isolator 400 operates in exactly the same manner as the preferred embodiment described above except that the third linear polarizer 58, used in the preferred embodiment, offers additional attenuation to overcome leakage which may occur when a single polarizer is used alone. Such leakage can result from imperfections in the polarizer materials and imperfect alignment of the polarizer transmission axes. It will also be appreciated that a further performance enhancement can be achieved by the use of a plurality of linear polarizers each located between the magneto-optical rotator 32 and the quarter wave retarder 60 to overcome leakage.

Figure 3:
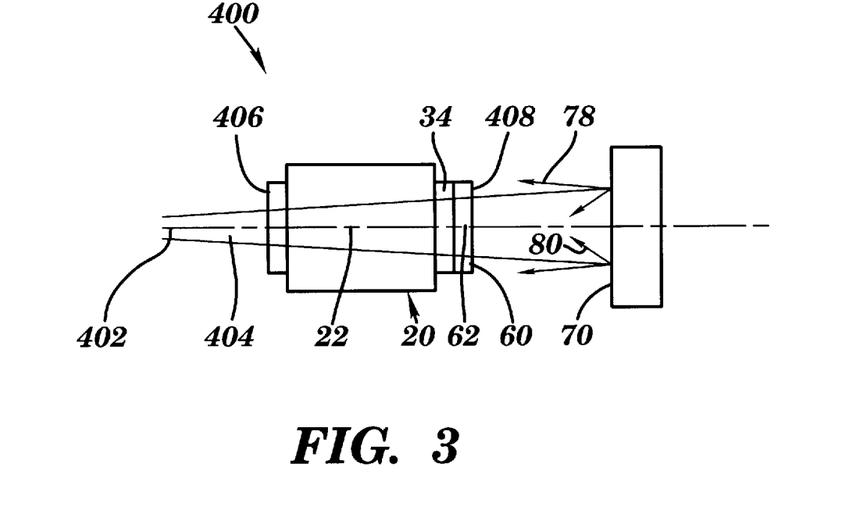
FIG. 3 details a forward traveling radiation beam passing through an apparatus for isolating specular and diffuse reflections from a boundary surface and a boundary surface from which specular and diffuse reflections are to be isolated.

In a more general embodiment of the present invention, an optical isolator system referred to generally by reference numeral 400 is shown in FIG. 3. The optical isolator system 400 comprises an optical isolator, referred to generally by the reference numeral 20, and a quarter wave retarder 60. The optical isolator 20 and quarter wave retarder 60 each have an optical axis, 22 and 60 respectively, which is positioned substantially parallel with a radiation beam propagation axis 402.

An unpolarized radiation beam 404 propagates from left to right along the propagation axis 402 and enters the optical isolator system 400 at an entrance aperture 406. The unpolarized radiation beam 404 passes through the optical isolator 20, then through the quarter wave retarder 60 and exits at an exit aperture 408. The optical isolator 20 is aligned such that the transmission axis of its second linear polarizer 34, is parallel with the second polarization axis 38. Quarter wave retarder 60 has its fast transmission axis aligned parallel with the first polarization axis 36. The state of polarization of the unpolarized radiation beam 404 is altered by the isolator system 400 such that a circularly polarized radiation beam 404 exits through the exit aperture 408. The state of polarization of the beam 404 as it passes through each element of the isolator 400 is described above in the preferred embodiment however the isolator system 400 does not include the third linear polarizer 58 of the preferred embodiment. Just as in the preferred embodiment, the isolator system 400 substantially extinguishes the specularly and diffusely reflected radiation beams, 78 and 80 reflected from the boundary surface.

Figure 4:
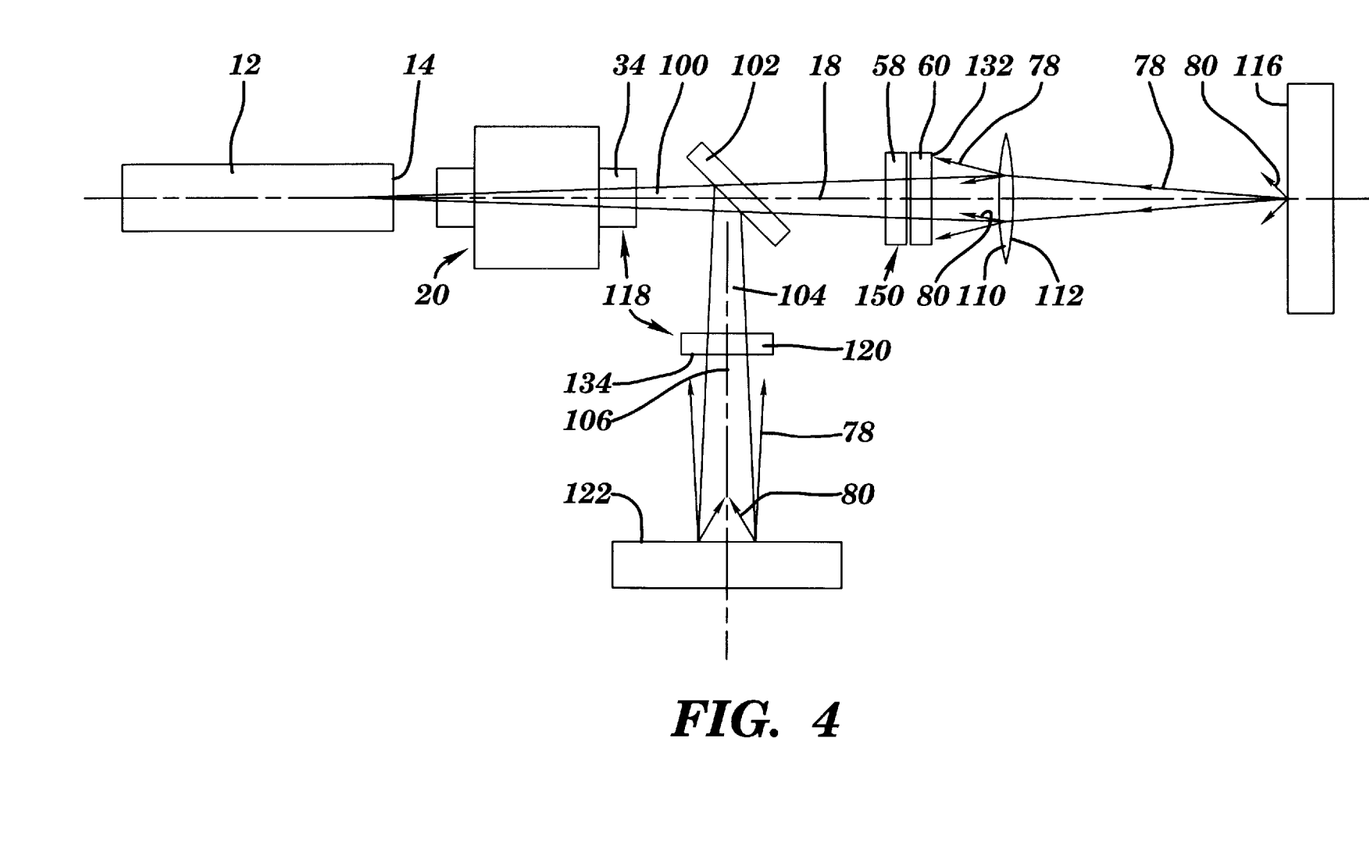
FIG. 4 depicts a laser optical system having a single laser with more than one laser beam propagation axis and more than one specular reflection isolator used in combination with a single optical isolator for optically isolating reflections from boundary surfaces encountered by the laser beam along each of the beam propagation axes; and, FIG. 5 shows a scanning laser optical system which includes a laser, a forward traveling laser beam, a beam deflector for deflecting the forward traveling laser beam to scan a boundary surface and specular and diffuse reflection isolating elements for isolating reflections from the boundary surface being scanned.

In a another embodiment, shown in FIG. 4, a single forward traveling laser beam 100 is split into two beams such that each beam propagates along a different propagation axis and two specular reflection isolators isolate reflections from boundary surfaces encountered by each beam. In this instance, more than one specular reflection isolator is used in combination with a single optical isolator 20.

In this embodiment, a first forward traveling laser beam 100 exits a laser aperture 14, propagates along a first propagation axis 18 and passes through an optical isolator 20, which linearly polarized the first forward traveling laser beam 100 such that its plane of linear polarization is aligned parallel with the second polarization axis 38. The linearly polarized first forward traveling laser beam 100 then passes through the partially reflective beam splitter 102 and a portion of the beam 100 continues to propagate along the first propagation axis 16. Another portion of the linearly polarized first forward traveling laser beam 100 is reflected by the partially reflective beam splitter 102 forming a second linearly polarized forward traveling laser beam 104 having a second propagation axis 106.

The linearly polarized first forward traveling laser beam 100 having passed through the beam splitter 102 next passes through a first specular reflection isolator, referred to generally by the reference numeral 150, which has the specific purpose of isolating spectral and diffuse reflections from a lens 108 and a boundary surface 116. The lens 108 has an optical axis, (not shown) which is coincident with the propagation axis 18, and two boundary surfaces 110 and 112. The spectral reflection isolator 150 comprises a linear polarizer 58 and a quarter wave retarder 60. The specular reflection isolator 150 and the optical isolator 20 work in combination to extinguish the specularly and diffusely reflected beams 78 and 80 reflected from the lens boundary surfaces 110 and 112 and from the other boundary surface 116. The transmission axis of the linear polarizer 58 is aligned parallel with the second polarization axis 38 and the fast transmission axis of the quarter wave retarder 60 is aligned parallel with the first polarization axis 36 such that the spectral reflection isolator 150 and the optical isolator 20 function identically to the preferred embodiment described above.

The linearly polarized second forward traveling laser beam 104 propagates along the propagation axis 106 and passes through a second specular reflection isolator, generally referred to by the reference numeral 118, which in this case comprises a quarter wave retarder 120 and the second linear polarizer 34, included within the optical isolator 20. The second specular reflection isolator 118 is identical to the embodiment shown in FIG. 3 and has the specific purpose of isolating spectral reflections from the boundary surface 122. The quarter wave retarder 120 has its fast transmission axis aligned with the first polarization axis 36.

The embodiment shown in FIG. 4 has a single entrance aperture 130 and a first exit aperture 132 through which the beam 100 exits and a second exit aperture 134 through which the beam 104 exits. The specular reflection isolators 150 and 118 each isolate reflections from as many boundary surfaces as may be encountered by the beams 100 and 104 and it will be appreciated that additional beams and specular reflection isolators can be added for each new propagation axis and that each of the additional specular reflection isolators can be used in combination with the single optical isolator 20. It will also be appreciated that the linear polarizer 58 can be removed from the specular reflection isolator 150 such that the quarter wave retarder 60 works in combination with the linear polarizer 34 to isolate reflections from the boundary surfaces 110, 112 and 116.

Figure 5:
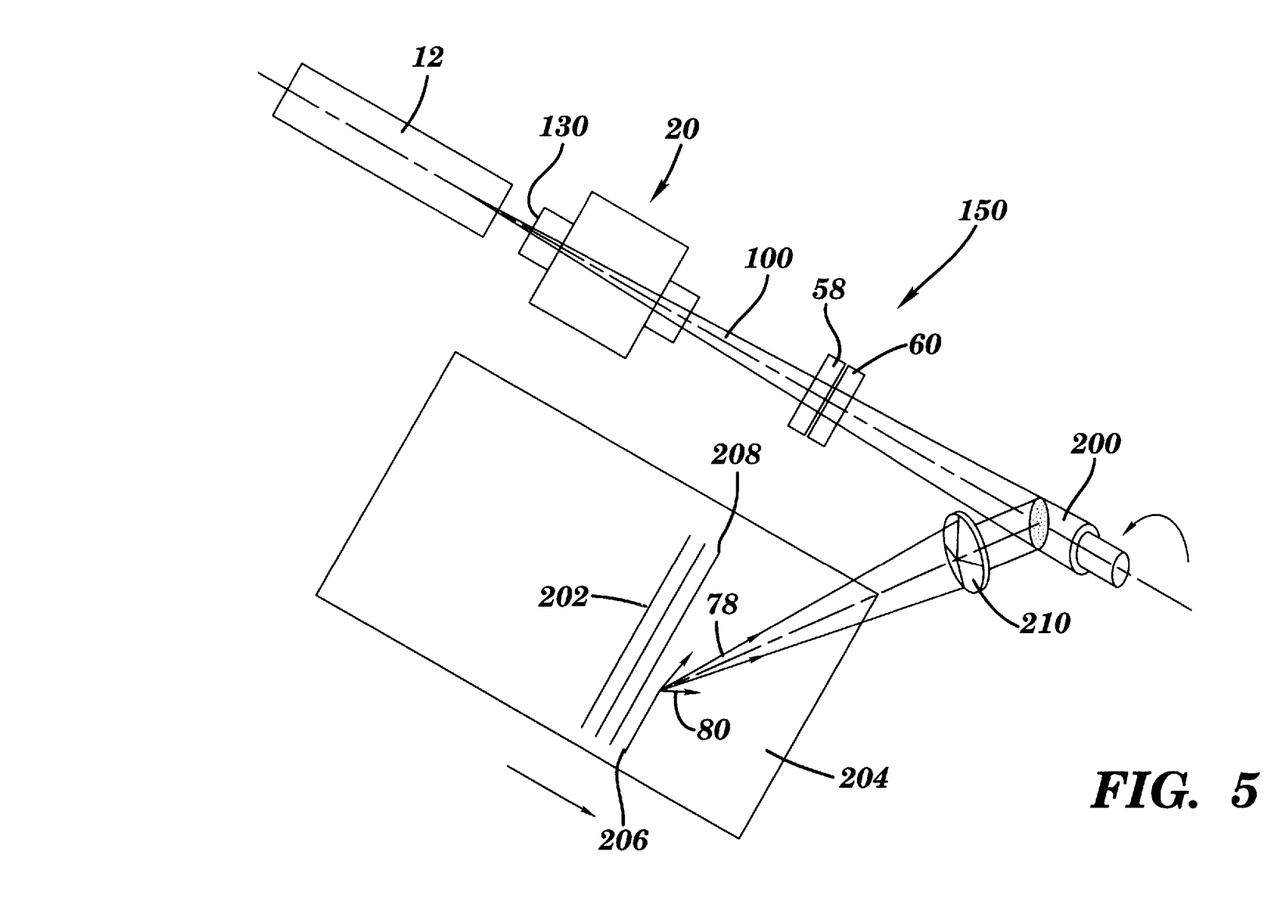

In a final embodiment shown in FIG. 5 a laser beam 100 passes through an optical isolator 20 and a specular reflection isolator, generally referred to by the reference numeral 150, before being deflected by a beam deflector 200. The specular reflection isolator 150 comprises a linear polarizer 58 and a quarter wave retarder 60 or a quarter wave retarder 60 alone as is described in the embodiments above. The beam deflector 200 continuously deflects the beam 100 such that it traverses a scan line 202 on a boundary surface 204 thereby canning the boundary surface 204 substantially from a first edge 206 to another edge 208.

To scan a region of the boundary surface 204, a stepwise or continuous motion along an axis substantially perpendicular to the scan line 202 moves either the boundary surface 204 relative to the scanning laser beam 100, or the scanning laser beam 100 relative to the boundary surface 204, such that after completing each scan line 202, the boundary surface 204 or scanning laser beam 100 is advanced for the next scan line until the entire region to be scanned is linewise scanned one scan line at a time. A lens 210 focuses the laser beam 100 onto the boundary surface 204 forming a focused spot. Specularly and diffusely reflected beams 78 and 80 return through the beam deflector 200 and are extinguished by the specular reflection isolator 150 and the optical isolator 20 as described in the preferred embodiment above.

In this final embodiment, the beam deflector 200 can be a continuously rotated or selectively positioned with an optical or holographic beam deflector element or an acousto-optical or electro-optical scanning apparatus for deflecting the beam 100 in response to an electrical signal. The boundary surface 204 can have any form including a planar and a cylindrical boundary surface and the boundary surface 204 may comprise an image to be scanned or an image recording material on which a laser image is to be recorded.

From the embodiments described above it will be appreciated that other embodiments can also be made without departing from the scope of the invention as defined in the following claims.

What we claim and desire to secure by Letters of Patent of the United States are the following:

1. A method for isolating reflections from at least one boundary surface encountered by a forward traveling radiation beam, said reflections resulting in a specularly reflected radiation beam and a diffusely reflected radiation beam each having at least a portion which is propagating in a direction which is substantially opposite to the propagation direction of said forward traveling radiation beam, comprising the steps of:

(a) linearly polarizing said forward traveling radiation beam thereby aligning the plane of linear polarization of said forward traveling radiation beam to be substantially parallel with a first polarization axis;

(b) rotating the plane of linear polarization of the linearly polarized forward traveling radiation beam, to a second polarization axis;

(c) circularly polarizing the linearly polarized forward traveling radiation beam having the plane of linear polarization substantially parallel with said second polarization axis with a first rotation sense, before said forward traveling radiation beam encounters said boundary surface, and linearly polarizing said specularly reflected radiation beam, thereby aligning the plane of linear polarization of said specularly reflected beam to be substantially perpendicular with said second polarization axis when said specularly reflected radiation beam is circularly polarized with a rotation sense which is opposite to said first rotation sense;

(d) linearly polarizing said specularly reflected radiation beam and said diffusely reflected radiation beam thereby aligning the respective planes of linear polarization to be substantially parallel with said second polarization axis;

(e) rotating the respective planes of linear polarization of the linearly polarized specularly reflected radiation beam and the linearly polarized diffusely reflected radiation beam which are substantially parallel with said second polarization axis, to a polarization axis which is substantially perpendicular to said first polarization axis; and thereafter, (f) passing the linearly polarized specularly reflected radiation beam and the linearly polarized diffusely reflected radiation beam having respective planes of linear polarization which are substantially perpendicular to said first polarization axis, through a linear polarizer having a transmission axis aligned substantially parallel with said first polarization axis.

2. A method for isolating reflections from at least one boundary surface encountered by a forward traveling radiation beam, said reflections resulting in a specularly reflected radiation beam and a diffusely reflected radiation beam each having at least a portion which is propagating in a direction which is substantially opposite to the propagation direction of said forward traveling radiation beam, comprising the steps of:

(a) linearly polarizing said forward traveling radiation beam thereby aligning the plane of linear polarization of said forward traveling radiation beam to be substantially parallel with a first polarization axis;

(b) rotating the plane of linear polarization of the linearly polarized forward traveling radiation beam, to a second polarization axis;

(c) circularly polarizing the linearly polarized forward traveling radiation beam having the plane of linear polarization aligned with said second polarization axis with a quarter wave retarder before said forward traveling radiation beam encounters said boundary surface;

(d) passing said specularly reflected radiation beam through said quarter wave retarder in a direction which is substantially opposite to the propagation direction of said forward traveling radiation beam;

(e) linearly polarizing said specularly reflected and said diffusely reflected radiation beams thereby aligning the respective planes of linear polarization to be substantially parallel with said second polarization axis;

(f) rotating the respective planes of linear polarization of said linearly polarized specularly reflected radiation beam and the linearly polarized diffusely reflected radiation beam, which are substantially parallel with said second polarization axis, to a polarization axis which is substantially perpendicular to said first polarization axis; and thereafter, (g) passing the linearly polarized specularly reflected radiation beam and the linearly polarized diffusely reflected radiation beam having respective planes of linear polarization substantially perpendicular to said first polarization axis, through a linear polarizer having a transmission axis aligned substantially parallel with said first polarization axis.

3. The method of claim 1 or 2 wherein said forward traveling radiation beam is a laser beam.

4. The method of claim 1 or 2 wherein at least a portion of said boundary surface comprises an image to be scanned and wherein said forward traveling radiation beam is linewise scanned across said image to be scanned.

5. The method of claim 4 wherein said forward traveling radiation beam is a laser beam.

6. The method of claim 1 or 2 wherein at least a portion of said boundary surface comprises an image recording material and wherein said forward traveling radiation beam is linewise scanned across said image recording material for recording an image.

7. The method of claim 6 wherein said forward traveling radiation beam is a laser beam.

8. An apparatus for isolating reflections from at least one boundary surface encountered by a forward traveling radiation beam having a first propagation axis, said reflections resulting in a specularly reflected radiation beam and a diffusely reflected radiation beam each having at least a portion which is propagating substantially along said first propagation axis in a direction which is substantially opposite to the propagation direction of said forward traveling radiation beam, said apparatus having an optical axis substantially coincident with said first propagation axis and is positioned between said forward traveling radiation beam and said at least one boundary surface, comprising:

(a) a first linear polarizer for linearly polarizing and aligning the plane of linear polarization of said forward traveling radiation beam substantially parallel with a first polarization axis and for extinguishing said specularly reflected radiation beam and said diffusely reflected radiation beam when the respective planes of linear polarization of each are substantially perpendicular to said first polarization axis;

(b) a polarization rotator, located between said first linear polarizer and said at least one boundary surface, for rotating the plane of linear polarization of said forward traveling radiation beam to a second polarization axis and for rotating the respective planes of linear polarization of said specularly reflected radiation beam and said diffusely reflected radiation beam to a polarization axis which is substantially perpendicular to said first polarization axis;

(c) a second linear polarizer, located between said polarization rotator and said at least one boundary surface having a transmission axis which is substantially parallel with said second polarization axis, for aligning the respective planes of linear polarization of said specularly reflected radiation beam and said diffusely reflected radiation beam to be substantially parallel with said second polarization axis; and, (d) a first circular polarizer, located between said second linear polarizer and said at least one boundary surface, for circularly polarizing the linearly polarized forward traveling radiation beam having the plane of linear polarization substantially parallel with said second polarization axis with a first rotation sense, and for linearly polarizing said specularly reflected radiation beam, thereby aligning the plane of linear polarization of said specularly reflected radiation beam substantially perpendicular to said second polarization axis, when said specularly reflected radiation beam is circularly polarized with a rotation sense which is opposite to said first rotation sense.

9. The apparatus of claim 8 further comprising a third linear polarizer, having an optical axis coincident with said first propagation axis and a transmission axis which is substantially parallel with said second polarization axis, for aligning the respective planes of linear polarization of said specularly reflected radiation beam and said diffusely reflected radiation beam substantially parallel with said second polarization axis, said third linear polarizer being located between said second linear polarizer and said first circular polarizer such that said forward traveling radiation beam, said specularly reflected radiation beam and said diffusely reflected radiation beam each pass through it.

10. The apparatus of claim 8 further comprising:

(a) a beam splitter positioned in the path of said forward traveling radiation beam between said second linear polarizer and said first circular polarizer for splitting said forward traveling radiation beam, thereby forming a second forward traveling radiation beam propagating along a second propagation axis;

(b) at least another boundary surface in the path of said second forward traveling radiation beam which produces a second specularly reflected and a second diffusely reflected radiation beam which propagate in a direction substantially opposite to said second forward traveling radiation beam to said beam splitter and then along said first propagation axis in a direction substantially opposite to said forward traveling radiation beam; and, (c) a second circular polarizer located between said beam splitter and said at least another boundary surface in the path of said second forward traveling radiation beam for circularly polarizing said second forward traveling radiation beam with a first rotation sense and for aligning the plane of linear polarization of said second specularly reflected and said second diffusely reflected radiation beams to be substantially perpendicular with said second polarization axis when said second specularly reflected radiation beam is circularly polarized with a rotation sense which is opposite to said first rotation sense.

11. The apparatus of claim 10 further comprising a third linear polarizer, having an optical axis substantially coincident with said second propagation axis and a transmission axis which is substantially parallel with said second polarization axis, for aligning the plane of linear polarization of said second specularly reflected radiation beam and said second diffusely reflected beam substantially parallel with said second polarization axis, said third linear polarizer being located between said beam splitter and said second circular polarizer such that said second forward traveling radiation beam, said second specularly reflected radiation beam and said second diffusely reflected beam each pass through it.

12. The apparatus of claim 10 further comprising a third linear polarizer, having an optical axis coincident with said first propagation axis and a transmission axis which is substantially parallel with said second polarization axis, for aligning the plane of linear polarization of said specularly reflected, said diffusely reflected, said second specularly reflected and said second diffusely reflected radiation beams substantially parallel with said second polarization axis, said third linear polarizer being located between said second linear and said beam splitter.

13. The apparatus of any of claims 8,9,10,11, or 12 wherein the said linear polarizing means are selected from the group consisting of dichroic, reflective, scattering or birefringent polarizers.

14. An apparatus for isolating reflections from at least one boundary surface encountered by a forward traveling radiation beam having a first propagation axis, said reflections resulting in a first specularly reflected radiation beam and a first diffusely reflected radiation beam each having at least a portion which is propagating substantially along said first propagation axis in a direction which is substantially opposite to the propagation direction of said forward traveling radiation beam, comprising:

(a) an optical isolator, comprising a polarization rotator disposed between a pair of linear polarizers having an optical axis substantially coincident with said first propagation axis, through which said forward traveling radiation beam, said first specularly reflected radiation beam and said first diffusely reflected radiation beam each pass, said optical isolator also having a transmission axis with which the plane of linear polarization of said forward traveling radiation beam is aligned substantially parallel after passing through it; and, (b) a first quarter wave retarder, having an optical axis substantially coincident with said first propagation axis, located between said at least one boundary surface and said optical isolator, through which said forward traveling radiation beam, said first specularly reflected radiation beam and said first diffusely reflected radiation beam each pass, said first quarter wave retarder having a transmission which is aligned at substantially 45 degrees with respect to the transmission axis of said optical isolator.

15. The apparatus of claim 14 further comprising:
(a) a beam splitter positioned in the path of said forward traveling radiation beam between said optical isolator and said first quarter wave retarder for splitting said forward traveling radiation beam, thereby forming a second forward traveling radiation beam propagating along a second propagation axis;
(b) at least another boundary surface in the path of said second forward traveling radiation beam which produces a second specularly reflected and a second diffusely reflected radiation beam which propagate in a direction substantially opposite to said second forward traveling radiation beam to said beam splitter and then along said first propagation axis in a direction substantially opposite to said forward traveling radiation beam; and,
(c) a second quarter wave retarder located between said beam splitter and said at least another boundary surface in the path of said second forward traveling radiation beam for circularly polarizing said second forward traveling radiation beam with a first rotation sense and for aligning the plane of linear polarization of said second specularly reflected and said second diffusely reflected radiation beams to be substantially perpendicular with said second propagation axis when said second specularly reflected radiation beam is circularly polarized with a rotation sense which is opposite to said first rotation sense.

16. The apparatus of claim 15 further comprising at least one linear polarizer having an optical axis substantially coincident with said first propagation axis and a transmission axis substantially parallel with the transmission axis of said optical isolator said at least one linear polarizer being positioned between said optical isolator and said first quarter wave retarder such that said forward traveling radiation beam, said first specularly reflected radiation beam and said first diffusely reflected radiation beam each pass through it.

17. The apparatus of claim 15 further comprising a linear polarizer having an optical axis substantially coincident with said first propagation axis and a transmission axis substantially parallel with the transmission axis of said optical isolator, said linear polarizer being positioned between said optical isolator and said beam splitter.

18. The apparatus of any of claims 8, 9, 10, 11, 12, 14, 15, 16 or 17, wherein said forward traveling radiation beam is a laser beam.

19. The apparatus of any of claims 8, 9, 10, 11, 12, 14, 15, 16 or 17, wherein said radiation beam is linewise scanned across at least one of said boundary surface.

20. A laser optical system for linewise scanning a forward traveling laser beam across a boundary surface, said forward traveling laser beam having a propagation axis, said boundary surface producing a specularly reflected laser beam and a diffusely reflected laser beam each having at least a portion which is propagating substantially along said propagation axis in a direction which is substantially opposite to the propagation direction of said forward traveling laser beam, said laser optical system comprising:
(a) a laser radiation source for producing said forward traveling laser beam;
(b) a first linear polarizer for linearly polarizing and aligning the plane of linear polarization of said forward traveling laser beam substantially parallel with a first polarization axis and for extinguishing said specularly reflected laser beam and said diffusely reflected laser beam when the respective planes of linear polarization of each are substantially perpenducular to said first plarization axis;
(c) a polarization rotator, located between said first linear polarizer and said boundary surface, for rotating the plane of linear polarization of said forward traveling laser beam to a second polarization axis and for rotating the respective planes of linear polarization of said specularly reflected laser beam and said diffusely reflected laser beam to a polarization axis which is substantially perpendicular to said first polarization axis;
(d) a second linear polarizer, located between said polarization rotator and said boundary surface and having a transmission axis which substantially parallel with said second polarization axis, for aligning the respective planes of linear polarization of said specularly reflected laser beam and said diffusely reflected laser beam substantially parallel with said second polarization axis;
(e) a circular polarizer, located between said second linear polarizer and said boundary surface, for circularly polarizing said linearly polarized forward traveling laser beam with the plane of linear polarization aligned with said second polarization axis with a first rotation sense and for linearly polarizing said specularly reflected laser beam with the plane of linear polarization substantially perpendicular to said second polarization axis when said specularly reflectd laser beam is circularly polarized with a rotation sense which is opposite to said first rotation sense; and,
(f) a beam deflector for linewise scanning said forward traveling laser beam across said boundary surface.

21. The apparatus of claim 20 further comprising at least another linear polarizer, having a transmission axis which is substantially parallel with said second polarization axis, for aligning the respective planes of linear polarization of said specularly reflected laser beam and said diffusely reflected laser beam substantially parallel with said second polarization axis, said at least another linear polarizer being located between said second linear polarizer and said circular polarizer such that said forward traveling laser beam said specularly reflected laser beam and said diffusely reflected laser beam each pass through it.

22. A laser optical system for linewise scanning a forward traveling laser beam across a boundary surface, said forward traveling laser beam having a propagation axis, said boundary surface producing a specularly reflected laser beam and a diffusely reflected laser beam each having at least a portion which is propagating in a direction which is substantially opposite to the propagation direction of said forward traveling laser beam, said laser optical system comprising:
(a) a laser radiation source for producing said forward traveling laser beam;
(b) an optical isolator, comprising a polarization rotator disposed between a pair of linear polarizers, having an optical axis substantially coincident with said propagation axis, through which said forward traveling laser beam, said specularly reflected laser beam and said diffusely reflected laser beam each pass, said optical isolator also having a transmission axis along which the plane of linear polarization of said forward traveling laser beam will be aligned after passing through it;
(c) a quarter wave retarder, having an optical axis substantially coincident with said propagation axis, located between said boundary surface and said optical isolator, through which said forward traveling laser beam, said specularly reflected laser beam and said diffusely reflected laser beam each pass, said quarter wave retarder also having a transmission axis which is aligned at substantially 45 degrees with respect to the transmission axis of said optical isolator; and, (d) a beam deflector for linewise scanning said forward traveling laser beam across said boundary surface.

23. The apparatus of claim 22 further comprising at least another linear polarizer, having an optical axis substantially coincident with said propagation axis, located between said optical isolator and said quarter wave retarder, through which said forward traveling laser beam, said specularly reflected laser beam and said diffusely reflected laser beam each pass, said linear polarizer having a transmission axis which aligned parallel with the transmission axis of said optical isolator.

24. The apparatus of any of claims 20, 21, 22 or 23 wherein at least a portion of said boundary surface comprises an image to be scanned.

25. The apparatus of any of claims 20, 21, 22 or 23 wherein at least a portion of said boundary surfaces comprises an image recording substrate.

* * * * *